United States Patent
Hunt et al.

[11] Patent Number: 5,991,298
[45] Date of Patent: Nov. 23, 1999

[54] RELIABLE AND FLEXIBLE MULTICAST MECHANISM FOR ATM NETWORKS

[75] Inventors: Douglas H. Hunt, Sudbury; Raj Krishnan Nair, Acton, both of Mass.

[73] Assignees: Fujitsu Network Communications, Inc., Richardson, Tex.; Fujitsu Limited, Kawasaki, Japan

[21] Appl. No.: 08/781,435

[22] Filed: Jan. 10, 1997

Related U.S. Application Data

[60] Provisional application No. 60/009,919, Jan. 12, 1996.

[51] Int. Cl.[6] .............................. H04L 12/28; H04L 12/56
[52] U.S. Cl. ........................................... 370/390; 370/401
[58] Field of Search .................................... 370/236, 390, 370/400, 401, 395, 408, 396, 255, 256

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |

(List continued on next page.)

FOREIGN PATENT DOCUMENTS 484943  3/1992  Japan.

OTHER PUBLICATIONS

An Ascom Timeplex White Paper, Meeting Critical Requirements with Scalable Enterprise Networking Solutions Based on a Unified ATM Foundation, pp. 1–12, Apr. 1994–1995?.

Douglas H. Hunt, ATM Traffic Management—Another Perspective, Business Communications Review, Jul. 1994.

Richard Bubenik et al., Leaf Initiated Join Extensions, Technical Committee, Signalling Subworking Group, ATM Forum/94–0325R1, Jul. 1, 1994.

Douglas H. Hunt et al., Flow Controlled Virtual Connections Proposal for ATM Traffic Management (Revision R2), Traffic Management Subworking Group, ATM_Forum/94–0632R2, Aug. 1994.

Flavio Bonomi et al., The Rate–Based Flow Control Framework for the Available Bit Rate ATM Service, IEEE Network, Mar./Apr. 1995, pp. 25–39.

(List continued on next page.)

*Primary Examiner*—Hassan Kizou
*Assistant Examiner*—Mitchell Slavitt
*Attorney, Agent, or Firm*—Weingarten, Schurgin, Gagnebin & Hayes LLP

[57] ABSTRACT

A method is disclosed for facilitating multicast operation in a network in which a data unit is multicast from a root node to a plurality of leaves via a plurality of branching point nodes in response to feedback processed at each branching point node. At least one cell forwarding technique is selected from a plurality of cell forwarding techniques at the respective branching point nodes. The cell forwarding techniques facilitate multicast operation by controlling forwarding and discard of multicast cells. The forwarding techniques are realized via use of a buffer ring in which cells are stored prior to forwarding. Manipulating head and tail pointers associated with the buffer ring allows for a plurality of desirable forwarding techniques.

23 Claims, 3 Drawing Sheets

U.S. PATENT DOCUMENTS

| | | | |
|---|---|---|---|
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McNarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/231 |
| 5,313,458 | 5/1994 | Suzuki | 370/56 |
| 5,315,585 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,325,356 | 6/1994 | Lyles | 370/60 |
| 5,327,420 | 7/1994 | Lyles | 370/60 |
| 5,327,424 | 7/1994 | Perlman | 370/85.13 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita et al. | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,351,146 | 9/1994 | Chan et al. | 359/118 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,398,235 | 3/1995 | Tsuzuki et al. | 370/16 |
| 5,398,242 | 3/1995 | Perlman | 370/85.13 |
| 5,400,333 | 3/1995 | Perlman | 370/85.13 |
| 5,400,337 | 3/1995 | Munter | 370/60.1 |
| 5,402,415 | 3/1995 | Turner | 370/60 |
| 5,412,648 | 5/1995 | Fan | 370/60 |

| | | | |
|---|---|---|---|
| 5,414,703 | 5/1995 | Sakaue et al. | 370/60 |
| 5,418,942 | 5/1995 | Krawchuk et al. | 395/600 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,426,635 | 6/1995 | Mitra et al. | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,448,621 | 9/1995 | Knudsen | 379/58 |
| 5,450,406 | 9/1995 | Esaki et al. | 370/60.1 |
| 5,452,296 | 9/1995 | Shimizu | 370/60.1 |
| 5,452,330 | 9/1995 | Goldstein | 375/257 |
| 5,454,299 | 10/1995 | Thessin et al. | 370/62 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,629 | 10/1995 | Ko | 370/110.1 |
| 5,463,775 | 10/1995 | DeWitt et al. | 395/184.01 |
| 5,465,331 | 11/1995 | Yang et al. | 395/200 |
| 5,465,365 | 11/1995 | Winterbottom | 395/600 |
| 5,469,003 | 11/1995 | Kean | 326/39 |
| 5,473,608 | 12/1995 | Gagne et al. | 370/85.13 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,511,070 | 4/1996 | Lyles | 370/60 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,615 | 5/1996 | Sefidvash et al. | 395/182.03 |
| 5,519,690 | 5/1996 | Suzuka et al. | 370/17 |
| 5,519,698 | 5/1996 | Lyles et al. | 370/60 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Digne et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,559,798 | 9/1996 | Clarkson et al. | 370/60.1 |
| 5,561,791 | 10/1996 | Mendelson et al. | 395/550 |
| 5,568,479 | 10/1996 | Watanabe et al. | 370/60.1 |
| 5,570,348 | 10/1996 | Holden | 370/17 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,584,037 | 12/1996 | Papworth et al. | 395/800.23 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,724,351 | 3/1998 | Chao et al. | 370/395 |

OTHER PUBLICATIONS

R. Jain, Myths About Congestion Management in High Speed Networks, Internetworking Research and Experience, vol. 3, 101–113 (1992).

Douglas H. Hunt et al., Credit–Based FCVC Proposal for ATM Traffic Management (Revision R1), ATM Forum Technical Committee Traffic Management Subworking Group, ATM_Forum/94–0168R1, Apr. 28, 1994.

Douglas H. Hunt et al., Action Item Status for Credit–Based FCVC Proposal, ATM Forum Technical Committee Traffic Management Subworking Group, ATM_Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

Rob Coltun et al., PRP: A P–NNI Routing Protocol Proposal, ATM Forum Technical Committee, ATM_Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signaling Protocol, ATM Forum Technical Committee, Signalling Subworking Group, ATM Forum 94–1078, Jan. 1, 1994.

H.T. Kung and K. Chang, Receiver–Oriented Adaptive Buffer Allocation in Credit–Based Flow Control for ATM Networks, Proceedings of INFOCOM '95, Apr. 2–6, 1995, pp. 1–14.

H.T. Kung et al., Credit–Based Flow Control for ATM Networks: Credit Update Protocol, Adaptive Credit Allocation, and Statistical Multiplexing, Proceedings of ACM SIGCOMM '94 Symposium on Communications Architectures, Protocols and Applications, Aug. 31–Sep. 2, 1994, pp. 1–14.

SITA, ATM RFP: C–Overall Technical Requirements, Sep. 1994.

Hosein F. Badran et al., Head of Line Arbitration in ATM Switches with Input–Output Buffering and Backpressure Control, Globecom, pp. 347–351, 1991.

RELIABLE AND FLEXIBLE MULTICAST MECHANISM FOR ATM NETWORKS

CROSS-REFERENCE TO RELATED APPLICATIONS

A claim of priority is made to U.S. Provisional Patent Application No. 60/009,919 entitled A RELIABLE AND FLEXIBLE MULTICAST MECHANISM FOR ABR SERVICE IN ATM NETWORKS, filed Jan. 12, 1996.

FIELD OF THE INVENTION

The present invention is generally related to Asynchronous Transfer Mode networks, and more particularly to multicasting within such networks.

BACKGROUND OF THE INVENTION

The advent of high-speed, cell-based, connection-oriented Asynchronous Transfer Mode ("ATM") networks creates a need for a reliable and flexible multicast mechanism that can support traditional LAN-based applications. Multicast functionality is required for implementation of "webcasting," routing, address-resolution and other inter-networking protocols. One of the early contributions to the ATM forum, "LAN Emulation's Needs For Traffic Management" by Keith McCloghrie, ATM Forum 94-0533, described multipoint connections in support of multicasting as one of the high-level requirements for LAN emulation. Such requirements may be viewed as including at least the same level of performance from an emulated LAN as from a traditional LAN in all respects, including multicast capability.

Known techniques for implementing multicast generally fall into two categories: "slowest-leaf wins" and "best-effort delivery." Slowest-leaf wins implies that the slowest leaf of the multicast connection determines the progress of the entire connection. While this technique prevents cell loss, it may be undesirable from the point of view of public-carrier networks where it is important to avoid allowing an arbitrary end-system from controlling the performance of the network. "Best-effort delivery" implies that cells are dropped for leaves that are unable to maintain a predetermined pace. While this technique prevents an arbitrary leaf from controlling the performance of the network, dropping cells in order to maintain performance may also be undesirable, as for example with loss sensitive transfers such as computer data transmission. While these techniques might be suitable for some multicast applications, neither technique provides a satisfactory multicast mechanism for the broad range of applications encountered in high-speed networks.

SUMMARY OF THE INVENTION

In a network where a data unit is multicast in a connection from a root node to a plurality of leaves via a plurality of branching point nodes, at least one forwarding technique selected from a plurality of forwarding techniques is implemented at each branching point node. The forwarding techniques facilitate multicast operation by controlling forwarding of multicast data units, and different connections may employ different forwarding techniques. Possible forwarding techniques that may be employed include a Prevent-Loss (PL) technique, a Prevent-Loss for Distinguished Subsets (PL(n)) technique, a Prevent-Loss for Variable Subset (p/n) technique, a K-Lag technique and a K-Lead technique.

Each branching point node includes a forwarding buffer which may be modeled as a ring buffer with two pointers: a head pointer and a tail pointer. A buffer system is also provided and data units are stored in the buffer system upon receipt before entering the ring buffer. The tail pointer points to the first received and buffered data unit in the series of the most recently received data units from upstream that has not yet been forwarded to any branch. The head pointer points to the oldest data unit that needs to be forwarded downstream to any branch. Thus, the data units stored in the ring buffer between the head and tail pointers need to be forwarded to one or more branches. The tail pointer advances by one buffer in a counter-clockwise direction with the forwarding of the most recent data unit in the ring and the arrival of the next most recent data unit that has not yet been forwarded to any branch. The head pointer advances as needed to indicate the current oldest data unit in the ring buffer. The advancement of the head pointer depends on the particular forwarding technique chosen from a range of possible techniques, each of which provides a different service guarantee. Each buffer, i, in the ring has an associated counter called a reference count, $r(i)$, that counts the number of branches to which the data unit in the buffer must be forwarded. If the index (i) increases from head pointer to tail pointer, then one may observe that $r(i)$ is a monotonically increasing function. Each time the tail pointer moves to a new buffer, the corresponding reference count is set to n, the number of downstream branches being serviced by that reference counter. Each time the data unit is forwarded to one of those branches, the reference counter is decremented by one. When the reference counter corresponding to the buffer at the position of the head pointer reaches 0, the head pointer is advanced in the counter-clockwise direction to the next buffer with a non-zero reference counter. Under no circumstance is the head pointer advanced beyond the tail pointer. Alternatively, there can be multiple instances of head and tail pointers with their associated reference counters where each instance can service a different disjoint subset of branches each with a possibly different service guarantee. In this case, it is important to advance the tail pointer only in relation to the head pointers from other subsets to avoid violating the service guarantees associated with those subsets of branches. In another alternative embodiment there can be a per-branch counter rather than a per-data unit buffer counter. The general principles of the mechanism remain the same. Different service guarantees can be supported by the above mechanism such as a Prevent-Loss (PL) technique, a Prevent-Loss for Distinguished Subsets (PL(n)) technique, a Prevent-Loss for Variable Subset (p/n) technique, a K-Lag technique, a K-Lead technique and other guarantees.

The Prevent-Loss (PL) technique prevents data loss within a connection. In particular, the Prevent-Loss technique ensures that each data unit that is received is forwarded to each branch. However, if a branch performs poorly, the effect of this poor performance may eventually propagate towards the root node and thereby affect all of the branches.

The Prevent-Loss (PL) technique is realized by ensuring that the tail pointer never overtakes the head pointer in all circumstances. The head pointer can advance only after its data unit has been forwarded to each branch, i.e., only when the reference count has decreased to zero. This implements the Prevent-Loss technique.

The Prevent-Loss for Distinguished Subsets technique guarantees delivery of the multicast data unit to predetermined subsets of branches in the multicast connection. More particularly, transmission to a distinguished subset of branches is made according to the Prevent-Loss technique described above. Hence, there is no data loss in this distinguished subset. A non-distinguished subset of branches consisting of the remaining branches in the connection, is not guaranteed delivery of the multicast data unit. Hence, the distinguished subsets of branches are insulated from possible poor performance by branches in the non-distinguished subset of branches.

The Prevent-Loss for Distinguished Subsets technique is implemented by using a separate set of reference counters for each distinguished subset of branches. The head pointer is advanced only after all members of the distinguished subset have been served. This makes it possible, for example, to provide a lossless service to the members of the distinguished subset of branches.

The K-Lag technique is realized by ensuring that the head pointer is advanced together with the tail pointer such that it is no more than a distance of K from the tail pointer. If the tail pointer is K data unit buffer positions ahead of the head pointer in the counter-clockwise direction, the data unit at the tail pointer is forwarded to any branch and the tail pointer advanced along with the head pointer one buffer position counter-clockwise, i.e., the data unit in the buffer position of the original head pointer is no longer guaranteed to be forwarded. It is possible that the data unit at the previous head pointer positions may yet be forwarded before being overwritten by that at the tail pointer. In an alternative embodiment, such a data unit can be deleted and not forwarded any more. It should also be noted that K must be at least 1. Different values of K give rise to different levels of service.

In a variation of the K-Lag technique, K-EPD (early packet discard), each branch is allowed to lag by up to K data units, as set by an upper memory bound associated with the branch. If the tail pointer is K buffer positions ahead of the head pointer in the counter-clockwise direction and the head pointer is pointing to a data unit in the middle of the frame, then the head pointer is advanced up to the End Of Frame data unit or one position before the tail pointer, to prevent forwarding of all data units associated with the respective frame and thus avoid the waste of network bandwidth and resources.

In the K-Lead technique, the fastest branches cannot be ahead of any other branches by more than K data units. The K-Lead technique is realized by ensuring that the tail pointer is not advanced more that a distance of K from the head pointer. If the tail pointer is K buffer positions ahead of the head pointer in the counter-clockwise direction, the data unit at the tail pointer may not be forwarded to any branch.

In the Prevent-Loss for Variable Subset (p/n) forwarding technique there is no data loss for p out of n branches. This is achieved as a variant to the PL technique. In this technique, the tail pointer is allowed to advance beyond the head pointer, as long as the corresponding reference counter is less than n-p. This ensures that a given data unit copy is delivered to at least p branches. It is possible that the unincluded branch may overflow at some point. However, the performance of the possibly overflowing branch does not affect the performance of branches in the subset of p branches. Hence, the technique provides protection for a subset of branches where the members of the subset are determined contemporaneously with the forwarding calculation.

BRIEF DESCRIPTION OF THE DRAWING

The invention will be more fully understood in view of the following Detailed Description of the Invention and Drawing, of which.

DETAILED DESCRIPTION OF THE INVENTION

Figure 1:
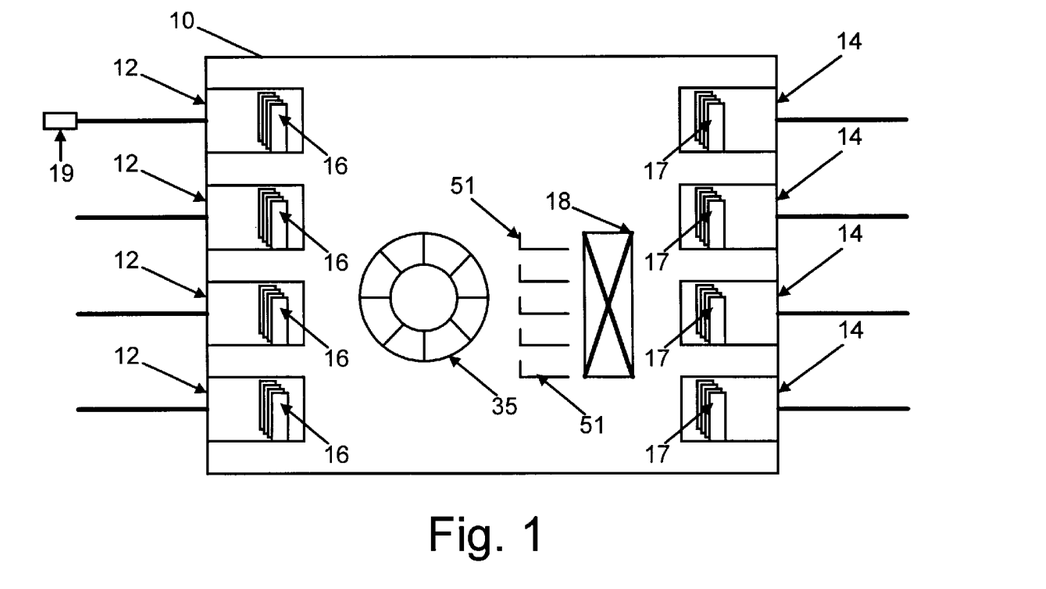
FIG. 1 is a block diagram of an ATM switch for providing reliable and flexible multicast.

FIG. 1 illustrates a switch 10 for achieving reliable and flexible multicast functionality for an Asynchronous Transfer Mode ("ATM") network. The switch 10 has a plurality of input ports 12 and output ports 14, each of which may include an associated buffer such as a First-In First-Out ("FIFO") memory 16, 17, respectively. The input ports 12 and output ports 14 are interconnected by a switch fabric 18 such that a data unit 19, as for example a cell, frame or packet, entering any of the input ports 12 may be transmitted through the switch fabric 18 to any of the output ports 14. In particular, when one input port is using one or more output ports, any other input can use any unused output ports. The output FIFOs 17 may be sized to cope with latency such that the switch is non-blocking, i.e., each FIFO 16 at the input side may be sized to achieve a target bandwidth utilization given the round trip latencies affecting the control loop, and each output FIFO 17 may be sized to cope with such latencies in the data forwarding path. Further, the switch is provided with hardware multicast capability.

Figure 2:
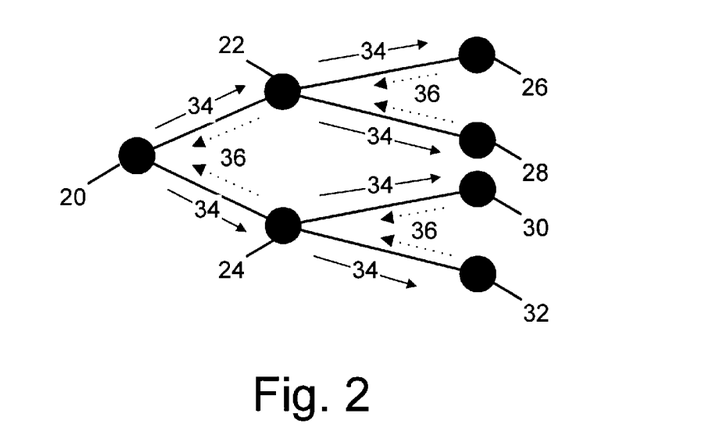
FIG. 2 is a block diagram of a network topology which illustrates forwarding techniques.

Referring now to FIG. 2, the multicast forwarding techniques will be described with regard to the illustrated tree network topology. The tree topology includes a root node 20, a plurality of branching point nodes ("branches") 22, 24 and a plurality of end-nodes, end-systems or leaves 26, 28, 30, 32. The end-systems may be hosts, routers, or switches that terminate the tree. The branching nodes 22, 24, which stem from the root node, are "parent" nodes having a plurality of "child" nodes stemming therefrom in the multicast tree. Data 34, such as cells, packets or frames, flow from the root node 20 to the branching point nodes 22, 24, and then to the leaves 26–32. Feedback updates 36 flow from the leaves to the branching point nodes in accordance with a point-to-point flow control technique as is known in the art. While illustrated with a single level of branching point nodes, the actual implementation may have multiple levels of branching point nodes. It should also be understood that the branching point nodes may feed either leaves, as illustrated, or other branching point nodes or combinations thereof depending upon the topology of the multicast tree.

Figure 3:
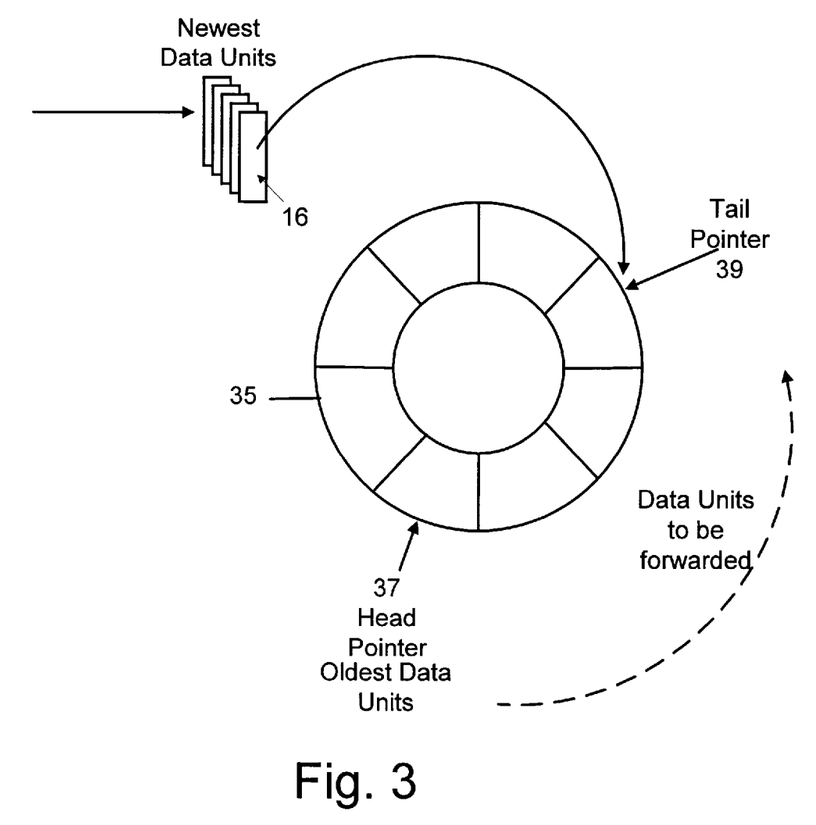
FIG. 3 illustrates a ring buffer.

Referring to FIGS. 2 and 3, at each branching point node, the forwarding buffer may be modeled as a ring buffer 35 with two pointers: a head pointer 37 and a tail pointer 39. An order retaining buffer system such as the FIFO 16 is also provided and data units are stored in the buffer system upon receipt before entering the ring buffer 35. The tail pointer 39 points to the first received and buffered data unit in the series of the most recently received data units from upstream that has not yet been forwarded to any branch. The head pointer 37 points to the oldest data unit that needs to be forwarded downstream to any branch. Thus, the data units stored in the ring buffer between the head and tail pointers need to be forwarded to one or more branches. The tail pointer advances by one buffer in a counter-clockwise direction with the forwarding of the most recent data unit in the ring and the arrival of the next most recent data unit that has not yet been forwarded to any branch. The head pointer advances as needed to indicate the current oldest data unit in the ring buffer. The advancement of the head pointer depends on the particular forwarding technique chosen from a range of possible techniques, each of which provides a different service guarantee. Each buffer, i, in the ring has an associated counter called a reference count, r(i), that counts the number of branches to which the data unit in the buffer must be forwarded. If the index (i) increases from head pointer to tail pointer, then one may observe that r(i) is a monotonically increasing function. Each time the tail pointer moves to a new buffer, the corresponding reference count is set to n, the number of downstream branches being serviced by that reference counter. Each time the data unit is forwarded to one of those branches, the reference counter is decremented by one. When the reference counter corresponding to the data unit buffer at the position of the head pointer reaches 0, the head pointer is advanced in the counter-clockwise direction to the next data unit buffer with a non-zero reference counter. Under no circumstance is the head pointer advanced beyond the tail pointer.

In an alternative embodiment, there can be multiple instances of head and tail pointers with their associated reference counters where each instance can service a different disjoint subset of branches each with a possibly different service guarantee. In this case, it is important to only advance the tail pointer in relation to the head pointers from other subsets to avoid violating the service guarantee associated with those subsets of branches.

In yet another embodiment, there can be a per-branch counter rather than a per-data unit buffer counter. The general principles of the mechanism remain the same.

The root node 20 as well as the branching point nodes 22, 24 execute the multicast forwarding technique. Any one of a plurality of forwarding techniques may be employed at the branching point nodes to support service guarantees for the branches of the multipoint connection. The forwarding techniques function to control the forwarding of multicast data units, and may protect portions of the multicast tree from the effects of poorer performing portions. Forwarding techniques may include a Prevent-Loss (PL) technique, a Prevent-Loss for Distinguished Subsets (PL(n)) technique, a Prevent-Loss for Variable Subset (p/n) technique, a K-Lag technique, a K-Lead technique and techniques offering other service guarantees.

Prevent-Loss (PL) is a forwarding technique where data unit loss is prevented by adjusting transmission of multicast data units so that each branch receives a copy of each multicast data unit. Prevent-Loss is realized by ensuring that the tail pointer never overtakes the head pointer in all circumstances. If the tail pointer is one, data unit buffer position behind the head pointer in the counter-clockwise direction (the ring is full), the data unit at the tail pointer may not be forwarded to any branch. This data unit may be forwarded only when the head pointer advances, i.e., when the reference count of the data unit at the head pointer becomes zero. Depending on the duration of such poor performance, the effect may propagate towards the root of the multicast tree, eventually affecting all leaves.

The Prevent-Loss for Distinguished Subsets technique guarantees delivery of the multicast data unit to a predetermined subsets of branches in the multicast connection. More particularly, transmission to a distinguished subset of branches is made according to the Prevent-Loss technique described above. Hence, there is no data loss in this distinguished subset. A non-distinguished subset of branches consisting of the remaining branches in the connection, is not guaranteed delivery of the multicast data unit. Hence, the distinguished subsets of branches are insulated from possible poor performance by branches in the non-distinguished subset of branches.

The Prevent-Loss for Distinguished subsets technique is implemented by using a separate set of reference counters for each distinguished subset of branches. The head pointer is advanced only after all members of the distinguished subset have been served. This makes it possible, for example, to provide a lossless service to the members of the distinguished subset of branches. Further, it should be understood that there may be more than one distinguished subset.

In the Prevent-Loss for Variable Subset (p/n) forwarding technique there is no data loss for p out of n branches. This is achieved as a variant to the PL technique. In this technique, the tail pointer is allowed to advance beyond the head pointer, as long as the corresponding reference counter is less than n-p. This ensures that a given data unit copy is delivered to at least p branches. It is possible that the unincluded branch may overflow at some point. However, the performance of the possibly overflowing branch does not affect the performance of branches in the subset of p branches. Hence, the technique provides protection for a subset of branches where the members of the subset are determined contemporaneously with the forwarding calculation.

Figure 4:
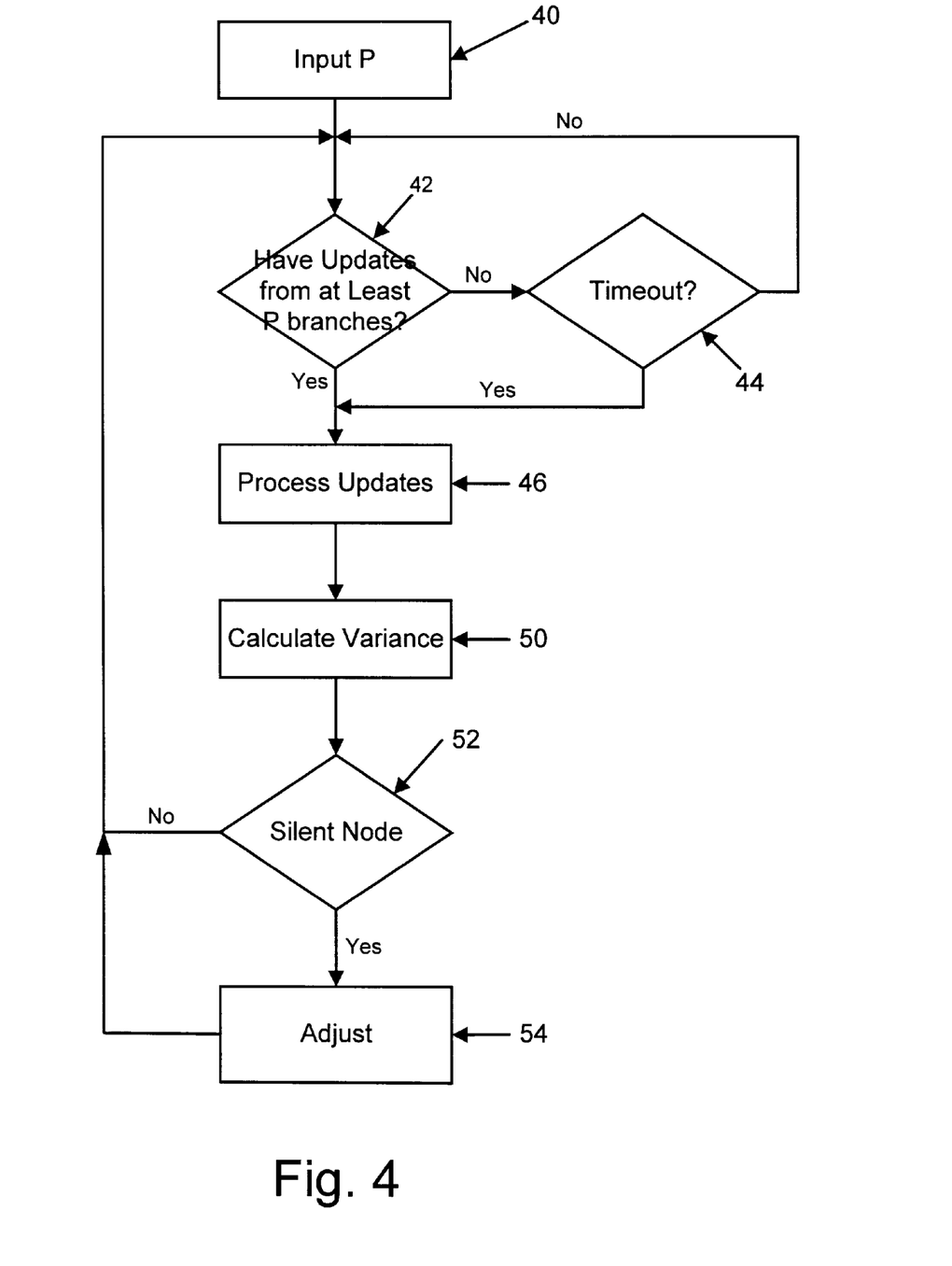
FIG. 4 is a flow diagram which illustrates a Prevent-Loss for Variable Subset (p/n) technique.

One embodiment of the Variable Subset technique is illustrated in FIG. 4. In a first step 40 an integer p is entered, where p is a selectable input. At iteration n=0, inquiry is made whether p feedback updates have been received from at least p branches as determined in step 42. Fewer feedback updates may be processed if a timeout occurs in step 44 before p feedback updates are collected. More feedback updates may be processed if a group of feedback updates pushing the total above p arrives contemporaneously. A processed update X(0) is then calculated in step 46 as the median of the gathered feedback updates. A variance v(0) is then calculated in step 50 for use as described below.

A FIFO queue 51 is maintained in the switch for each branch in the multicast connection. The fullness of such FIFO queues is indicative of absence of feedback updates from the associated branches. At an iteration n=m, feedback updates are obtained from p leaves. If at least one leaf fails to deliver a feedback update in the previous iteration (n-1) as determined in step 52, fewer than p leaves are utilized by adjusting the number of leaves required in step 54. Given the following definitions:

q(i)=fullness of forwarding FIFO queue i branch;
q(j,m)=fullness of forwarding FIFO queue j branch at iteration m;
x(m)=median of q(i,m) at iteration m;
v(m)=variance of q(i,m) at iteration m;
x(m,m-1)=median of q(i,m) over iterations m and m-1; and
v(m,m-1)=variance of q(i,m) over iterations m and m-1, then an outlier (j) at time (n=m) is removed from the pool and is not to be waited for at n=m+1 if the following is true:
$[q(j,m)-x(m)]^2 > v(m)$ or
$[q(j,m)-x(m,m-1)]^2 > v(m,m-1)$, where
$v(m) = \Sigma_i [((q(i)-x(m))/p]^2$,
$v(m-1,m-2) = \Sigma_i \Sigma_j [((q(i)q(j)-x(m-1,m-2))/p]^2$,
x(m)=median of p updates, and
x(m-1, m-2)=median of p updates at both time instances.

However, if a feedback update is received from the previously silent node while updates are being gathered, then that feedback update is included in the calculation. Hence, v(m) is calculated in step 50, and any branches which have not provided a feedback update in the previous iteration should not be considered in the next iteration are detected in step 52.

If all leaves were unresponsive in the previous "y" iterations, where "y" is a small number like 1, 2 or 3, then the processed update is computed with fewer than p updates. If an update is received from a specified leaf, that update is added to the pool for processing. Further, if the outbound FIFO for a specified leaf or branch is stale (i.e., if that FIFO corresponds to a branch that is not being considered), then four steps may be executed: (A) drop the p earliest data units in the FIFO; or (B) forward the p earliest data units in the FIFO; or (C) drop the p latest data units in the FIFO; or (D) forward the p latest data units and drop the remaining data units in the FIFO. In cases C and D, the FIFO for the specified leaf is considered to be RESTARTED.

Figure 5:
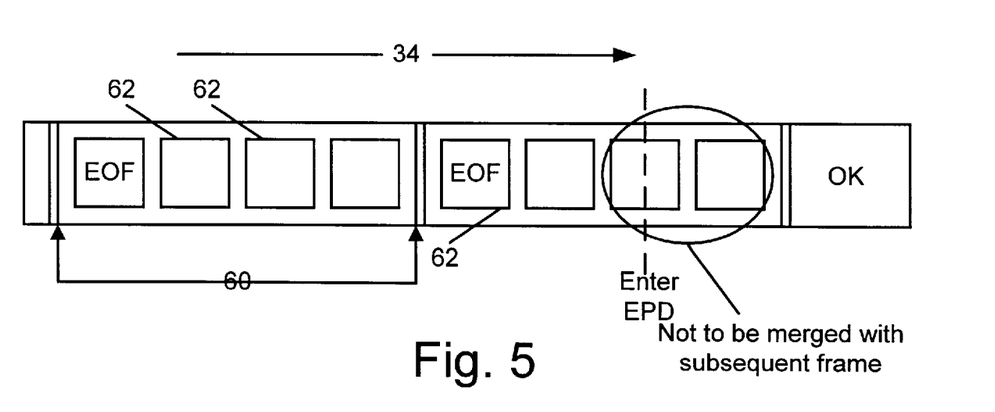
FIG. 5 is a diagram which illustrates the K-EPD technique.

Referring to FIGS. 2 and 5, in the K-Lag service, the slowest branches are guaranteed to not lag the fastest by more than K data units. The K-Lag service is realized by ensuring that the head pointer is advanced together with the tail pointer such that it is no more than a distance of K from the tail pointer. If the tail pointer is K data unit buffer positions ahead of the head pointer in the counter-clockwise direction and if the data unit at the tail pointer has been forwarded to any branch, then the tail pointer is advanced along with the head pointer one data unit buffer position counter-clockwise. In this circumstance the data unit in the buffer position of the original head pointer is no longer guaranteed to be forwarded. It is possible that the data unit at the previous head pointer positions may yet be forwarded before being overwritten by that at the tail pointer. In an alternative embodiment, such a data unit can be deleted and not forwarded any more. It should also be noted that K must be at least 1. Different values of K give rise to different levels of service.

In a variation of the K-Lag technique, K-EPD, each branch is allowed to lag by up to K data units, as set by an upper memory bound associated with the leaf. If the tail pointer is K data unit buffer positions ahead of the head pointer in the counter-clockwise direction and the head pointer is pointing to a data unit in the middle of the frame, then the head pointer is advanced up to the end of the frame data unit or one position before the tail pointer, to prevent forwarding of all data units associated with the respective frame and thus avoid the waste of network bandwidth and resources.

In the K-Lead technique, the fastest branches cannot be ahead of any other branches by more that K data units. The K-Lead technique is realized by ensuring that the tail pointer is not advanced more that a distance of K from the head pointer. If the tail pointer is K data unit buffer positions ahead of the head pointer in the counter-clockwise direction, the data unit at the tail pointer may not be forwarded to any branch.

Having described the preferred embodiments of the invention, it will now become apparent to one of skill in the art that other embodiments incorporating the presently disclosed method and apparatus may be used. Accordingly, the invention should not be viewed as limited to the disclosed embodiments, but rather should be viewed as limited only by the spirit and scope of the appended claims.

We claim:

1. A method for forwarding a multicast data unit from a branching node to at least one of a plurality of coupled downstream nodes, comprising the steps of:

determining, the eligibility of respective nodes to receive said multicast data unit based upon a specified multicast data unit forwarding technique selected from a plurality of multicast data unit forwarding techniques; and forwarding said data unit to selected ones of said coupled downstream nodes based upon said specified data unit forwarding technique, wherein the selected ones of the coupled downstream nodes at least at some times form a subset of the coupled downstream nodes.

2. The method of claim 1 wherein said eligibility determining step includes analyzing feedback updates received from respective downstream nodes.

3. The method of claim 1 including the further step of employing a data unit forwarding ring buffer to execute said specified data unit forwarding technique.

4. The method of claim 1 wherein the forwarding step includes the further step of employing a data unit forwarding technique in which no downstream node is allowed to lead ahead of another downstream node by more than K data units.

5. The method of claim 1 wherein the forwarding step includes the further step of employing a data unit forwarding technique in which loss of data is prevented between the branching node and each downstream node in the multicast connection.

6. A method for forwarding a multicast data unit from a branching node to at least one of a plurality of coupled downstream nodes, comprising the steps of:

determining, the eligibility of respective nodes to receive said multicast data unit based upon a specified multicast data unit forwarding technique selected from a plurality of multicast data unit forwarding techniques; and forwarding said data unit to selected ones of said coupled downstream nodes based upon said specified data unit forwarding technique, wherein the forwarding step includes the further step of employing a data unit forwarding technique in which loss of data units is prevented between the branching point node and a distinguished subset of downstream nodes in the multicast connection.

7. The method of claim 6 including the further step of designating a non-distinguished subset of downstream nodes in the multicast connection which are not entirely protected from data loss.

8. A method for forwarding a multicast data unit from a branching node to at least one of a plurality of coupled downstream nodes, comprising the steps of:

determining, the eligibility of respective nodes to receive said multicast data unit based upon a specified multicast data unit forwarding technique selected from a plurality of multicast data unit forwarding techniques; and forwarding said data unit to selected ones of said coupled downstream nodes based upon said specified data unit forwarding technique, wherein the forwarding step includes the further step of employing a technique in which loss of data is prevented between the branching node and a variable subset of (p) downstream nodes in the multicast connection having most recently provided a feedback update to the branching node.

9. The method of claim 8 including the further step of including at least the (p) most recent feedback updates to determine the downstream nodes in the distinguished subset, where (p) is an input.

10. A method for forwarding a multicast data unit from a branching node to at least one of a plurality of coupled downstream nodes, comprising the steps of:

determining, the eligibility of respective nodes to receive said multicast data unit based upon a specified multicast data unit forwarding technique selected from a plurality of multicast data unit forwarding techniques; and     forwarding said data unit to selected ones of said coupled downstream nodes based upon said specified data unit forwarding technique, wherein the forwarding step includes the further step of employing a data unit forwarding technique in which no downstream node is allowed to lag behind another downstream node by more than K data units.

11. The method of claim 10 wherein the data units are grouped into frames, and including the further step of discarding any remaining portion of a frame if a downstream node lags behind another downstream node by K data units while the frame is being transmitted.

12. A multicast apparatus for transmitting multicast data units in a multicast connection from a branching node to a plurality of downstream nodes, comprising:

a memory in each downstream node for receiving multicast data units;

a circuit for providing information indicating fullness of the downstream node memory, the circuit providing such fullness information to the branching node in accordance with a point-to-point flow control technique; and     a circuit in each branching node for processing the fullness information in accordance with a data unit forwarding technique selectable from a plurality of data unit forwarding techniques; and     a forwarding circuit in each branching node for forwarding the multicast data unit to selected ones of the plurality of downstream nodes responsive to the selected data unit forwarding technique, wherein the selected ones of the downstream nodes at least at some times form a subset of the plurality of downstream nodes.

13. The apparatus of claim 12 further including a circuit in each downstream node for providing feedback updates indicating memory fullness to the branching node.

14. The apparatus of claim 12 wherein the branching point node includes a data unit forwarding ring buffer having a head pointer and a tail pointer.

15. The apparatus of claim 12 wherein the branching point node further includes a buffer system for storing incoming data units prior to forwarding of such incoming data units from said buffer system to the ring buffer.

16. The apparatus of claim 12 wherein the selected data unit forwarding technique prevents any downstream node from leading ahead of any other downstream node by more than K data units.

17. The apparatus of claim 12 wherein the selected data unit forwarding technique prevents loss of data units between the branching node and each downstream node connected thereto.

18. A multicast apparatus for transmitting multicast data units in a multicast connection from a branching node to a plurality of downstream nodes, comprising:

a memory in each downstream node for receiving multicast data units;

a circuit for providing information indicating fullness of the downstream node memory, the circuit providing such fullness information to the branching node in accordance with a point-to-point flow control technique; and     a circuit in each branching node for processing the fullness information in accordance with a data unit forwarding technique selectable from a plurality of data unit forwarding techniques, wherein the selected data unit forwarding technique prevents loss of data units between the branching point node and a distinguished subset of downstream nodes connected thereto.

19. The apparatus of claim 18 wherein the selected data unit forwarding technique does not prevent loss for a non-distinguished subset of downstream nodes connected thereto.

20. A multicast apparatus for transmitting multicast data units in a multicast connection from a branching node to a plurality of downstream nodes, comprising:

a memory in each downstream node for receiving multicast data units;

a circuit for providing information indicating fullness of the downstream node memory, the circuit providing such fullness information to the branching node in accordance with a point-to-point flow control technique; and     a circuit in each branching node for processing the fullness information in accordance with a data unit forwarding technique selectable from a plurality of data unit forwarding techniques, wherein the selected data unit forwarding technique prevents data unit loss for a variable subset (p) of downstream nodes connected thereto.

21. The apparatus of claim 20 wherein the members of the variable subset (p) are the (p) downstream nodes most recently having provided memory fullness information to the branching node, where (p) is an input.

22. A multicast apparatus for transmitting multicast data units in a multicast connection from a branching node to a plurality of downstream nodes, comprising:

a memory in each downstream node for receiving multicast data units;

a circuit for providing information indicating fullness of the downstream node memory, the circuit providing such fullness information to the branching node in accordance with a point-to-point flow control technique; and     a circuit in each branching node for processing the fullness information in accordance with a data unit forwarding technique selectable from a plurality of data unit forwarding techniques, wherein the selected data unit forwarding technique prevents any downstream node from lagging behind any other downstream node by more than K data units.

23. The apparatus of claim 22 wherein the data units are grouped into frames, and wherein any portion of a frame remaining to be transmitted is discarded when a downstream node lags behind another downstream node by K data units while the frame is being transmitted.

* * * * *

UNITED STATES PATENT AND TRADEMARK OFFICE
CERTIFICATE OF CORRECTION

PATENT NO     :   5,991,298
DATED         :   November 23, 1999
INVENTOR(S)   :   Douglas H. Hunt, et al.

It is certified that error appears in the above-identified patent and that said Letters Patent are hereby corrected as shown below:

Column 8, line 1, "nodes to receive", should read --nodes downstream of said branching node to receive--;

Column 8, line 30, "nodes to receive", should read --nodes downstream of said branching node to receive--;

Column 8, line 51, "nodes to receive", should read --nodes downstream of said branching nodes to receive--; and Column 9, line 4, "nodes to receive", should read --nodes downstream of said branching nodes to receive--.

Signed and Sealed this

Eighth Day of May, 2001

*Attest:*

NICHOLAS P. GODICI

*Attesting Officer*        *Acting Director of the United States Patent and Trademark Office*